US006819494B2

(12) United States Patent
Liu et al.

(10) Patent No.: US 6,819,494 B2
(45) Date of Patent: Nov. 16, 2004

(54) LENS-IMPLANTED OPTICAL SHEET AND METHOD FOR MANUFACTURING THE SAME

(75) Inventors: Chen-Hua Liu, Taipei (TW); Guang-Tau Sung, Feng-yuan (TW)

(73) Assignee: AU Optronics Corp., Hsinchu (TW)

( * ) Notice: Subject to any disclaimer, the term of this patent is extended or adjusted under 35 U.S.C. 154(b) by 161 days.

(21) Appl. No.: 10/119,836

(22) Filed: Apr. 11, 2002

(65) Prior Publication Data

US 2002/0149853 A1 Oct. 17, 2002

(30) Foreign Application Priority Data

Apr. 11, 2001 (TW) .................................... 90108703 A

(51) Int. Cl.[7] .............................................. G02B 27/10
(52) U.S. Cl. ...................................... 359/625; 359/619
(58) Field of Search ................................ 359/619, 620, 359/625, 628, 642, 741, 742

(56) References Cited

U.S. PATENT DOCUMENTS 5,519,539 A * 5/1996 Hoopman et al. .......... 359/741

* cited by examiner

*Primary Examiner*—Hung Xuan Dang
(74) *Attorney, Agent, or Firm*—Bacon & Thomas

(57) ABSTRACT

A method for manufacturing a lens-implanted optical sheet is disclosed, which includes following steps: (A) laying a patterned screen mask on an inner surface of a mold (B) coating or transferring-printing a layer of an adhesive or a binder on said inner surface (C) removing said patterned mask (D) locating said lens or said prisms on said adhesive or said binder (E) closing said mold and injecting a polymer into said mold to form a molded optical sheet; and (F) opening said mold. The lens-implanted optical sheet with a smooth surface and with a simple structure is also revealed here.

6 Claims, 2 Drawing Sheets

LENS-IMPLANTED OPTICAL SHEET AND METHOD FOR MANUFACTURING THE SAME

BACKGROUND OF THE INVENTION

1. Field of the Invention

The present invention relates to an optical sheet and a method for producing the optical sheet and, more particularly, to an optical sheet used for photoelectrical devices and the method for manufacturing it.

2. Description of Related Art

Currently, conventional optical sheets (prism sheets) are widely used in many kinds of photoelectrical devices (e.g. the backlight module of a LCD device). Generally speaking, conventional optical sheets (prism sheets) are made by injection molding process. In most cases, a pretreatment for the mold for manufacturing the conventional optical sheets (prism sheets) before injection molding is required. These pre-treatments include forming grooves on a surface of a mold for transferring-printing and forming the corresponding prisms of the conventional optical sheets (prism sheets). However, the formation of grooves (e.g. V-cut processing or etching) on the surface of a mold is complicate and takes a very long time. On the other hand, the grooves on the surface of the mold for transferring-printing and forming the corresponding prisms of the conventional optical sheets are easily worn after frequent transferring-printing through injection molding. Therefore, the lifetime of the mold used for transferring-printing pattern of prisms of the conventional optical sheets (prism sheets) is not long. Hence, the cost for maintaining, developing or modifying the mold for the conventional optical sheets (prism sheets) is high.

Therefore, it is desirable to provide an improved method to mitigate and/or obviate the aforementioned problems.

SUMMARY OF THE INVENTION

The object of the present invention is to provide a method for manufacturing optical sheets to reduce the cost for mass-producing the optical sheets and save the time for mass-producing the optical sheets.

Another object of the present invention is to provide a method for manufacturing optical sheets to extend the lifetime of the mold used for producing the optical sheets.

Another object of the present invention is to provide an optical sheet to simplify the adjusting or the switching of the patterns of the lens or the prisms of the optical sheet.

Another object of the present invention is to provide an optical sheet with a smooth surface.

To achieve the object, the method for manufacturing a lens-implanted optical sheet of the present invention includes following steps: (A) laying a patterned screen mask having a plurality of holes or grooves on an inner surface of a mold; (B) coating or transferring-printing a layer of an adhesive or a binder on part of said inner surface through said grooves or said holes of said patterned screen mask; (C) removing said patterned mask from said inner surface of said mold; (D) spraying or distributing a plurality of lens or prisms and locating said lens or said prisms on said adhesive or said binder on said inner surface of said mold; closing said mold and injecting a polymer into said mold to form a molded optical sheet; and (F) opening said mold and taking out said molded optical sheet.

Another method for manufacturing a lens-implanted optical sheet of the present invention includes following steps: (A) coating or transferring-printing a layer of an adhesive or a binder on part of an inner surface of a mold; (B) laying a plurality of lens or prisms on said inner surface of said mold through the binding of said adhesive or said binder; (C) closing said mold and injecting a polymer into said mold to form a molded optical sheet; and (D) opening said mold and taking out said molded optical sheet.

The lens-implanted optical sheet of the present invention includes: a base plate; and a plurality of lens or prisms embedded in said base plate.

Other objects, advantages, and novel features of the invention will become more apparent from the following detailed description when taken in conjunction with the accompanying drawings.

DETAILED DESCRIPTION OF THE PREFERRED EMBODIMENT

The method for manufacturing a lens-implanted optical sheet of the present invention can selectively further includes coating a release agent on the inner surface before coating or transferring-printing a layer of an adhesive or a binder on part of an inner surface of a mold. The lens or prisms can be any conventional lens or prisms. Preferably, the lens or prisms are lens or prisms are in a shape of a stripe, a bar, tetrahedron, pyramids, cones, egg, half-balls or balls. The injected polymer can be any conventional polymer used for the molded optical sheets. Preferably, the injected polymer is polymethyl methacrylate (PMMA). The lens-implanted optical sheet of the present invention is preferred to be a sheet that owns a smooth surface. The smooth surface of the lens-implanted optical sheet of the present invention is made of at least one surface of each len or each prism and part of the base plate. The surface of each len or each prism on the smooth surface is on the same plane of the surface of said lens-implanted optical sheet. The adhesive or the binder used in the manufacturing method of the present invention can be coated on the inner surface of the male mold through any conventional process.

Figure 1:
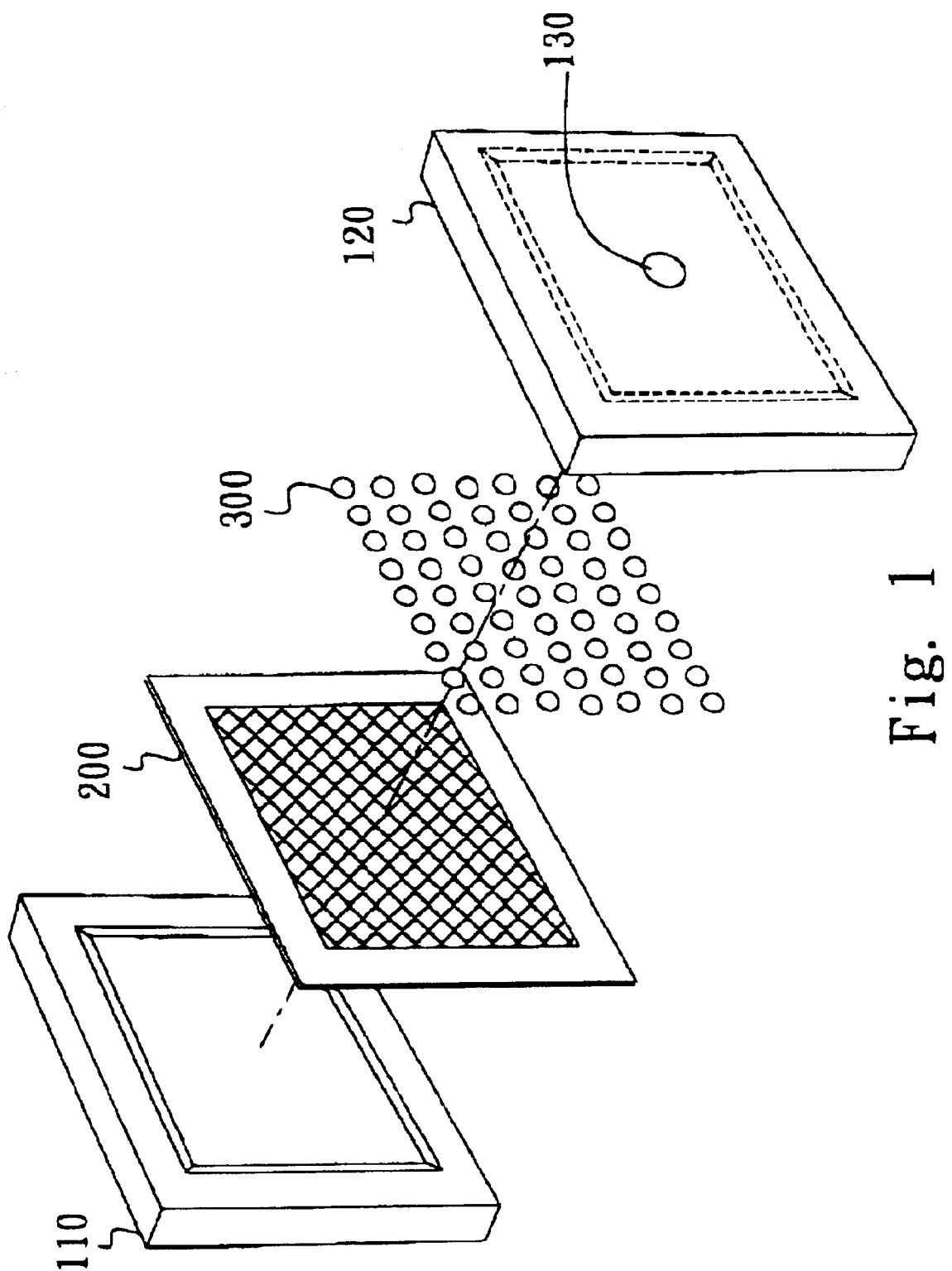
FIG. 1 is a schematic view of the method of the present invention for manufacturing a lens-implanted optical sheet.
Figure 2:
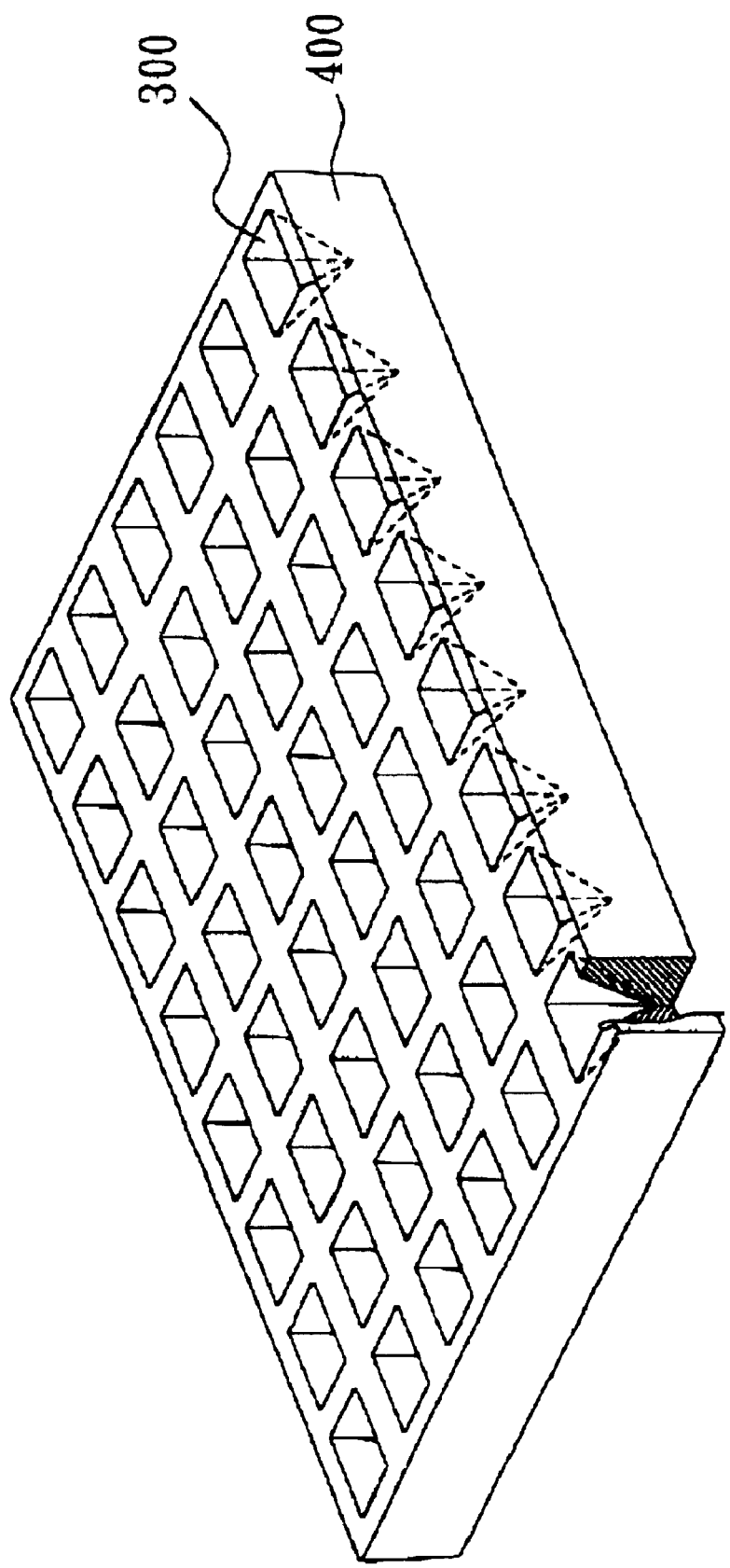
FIG. 2 is a perspective view of the lens-implanted optical sheet of the present invention.

With reference to FIG. 1, there is shown a schematic view of the method of the present invention for manufacturing a lens-implanted optical sheet. The lens-implanted optical sheet is made by laying a screen mask 200 (or a screen plate) on an inner surface of a male mold 110. The screen mask 200 (or a screen plate) is a screen mask with a plurality of predetermined patterned grooves or patterned holes. The predetermined pattern of the holes of the screen mask 200 (or a screen plate) of the present embodiment is corresponding to the pattern of the lens or the prisms that will be formed on the lens-implanted optical sheet in future. The predetermined pattern of the screen mask 200 (or a screen plate) of the present embodiment can be prepared by conventional methods. In the present embodiment, the pattern of the holes on the screen mask 200 is arranged in an array. After the patterned screen mask 200 is laid on the inner surface of the male mold 110, a layer of an adhesive is coated on the screen mask 200. Part of the adhesive is coated on the inner surface of the male mold 110 through the hole of the screen mask 200. A pattern of adhesive formed on the inner surface of the male mold 110 is as same as that of the screen mask 200. The screen mask 200 is then removed from the inner surface of the male mold 110. A patterned adhesive layer forms on the inner surface of the male mold 110. A plurality of lens 300 in a shape of a pyramid is scattered on the inner surface of the male mold 110. Part of the lens 300 are bound on the corresponding transferring-printing sites of the inner surface of the male mold 110 through the binding of the patterned adhesive. The lens 300 on the inner surface of the male mold 110 can be adjusted to make one surface of each len face the inner surface of the male mold 110. After the positions of lens 300 on the inner surface of the male mold 110 is fixed, the male mold 110 is combined with a female mold 120 to form a closed mold. Then a polymer from a port 130 is injected into the combined and closed mold to form a molded optical sheet. The polymer can be any conventional molding polymer used for molding optical components. In the present embodiment, the polymer is polymethyl methacrylate (PMMA). The combined mold is then cooled down. A molded lens-implanted optical sheet (as shown in FIG. 2) is obtained after the combined mold is opened. The lens-implanted optical sheet of the present embodiment includes a base plate 400 and lens 300 which are embedded in the base plate 400.

Since the lens or prisms are embedded into the base plate (or the substrate) of the lens-implanted optical sheet, the surface of the molded optical sheet can be adjusted to be a smooth plane by adjusting the positions or the angles of the lens. The smooth plane of the lens-implanted optical sheet of the present invention is different from the graded surface of conventional optical sheet (prism sheet) used in the LCD backlight module. On the other hand, the conventional optical sheets (prism sheets) for the LCD backlight module are manufactured by V-cutting or by etching the inner surface of the male mold first. Then the conventional optical sheet (prism sheet) formed through injection molding. The pretreatment (e.g. V-cutting or by etching the inner surface of the male mold) is complicate and takes very long time. However, since the method for manufacturing the lens-implanted optical sheet of the present invention is made without V-cutting or etching pretreatment, the manufacturing process is simplified and the time can be saved. In addition, the method for manufacturing the lens-implanted optical sheet of the present invention also improves the flexibility for the production of various lens-implanted optical sheet of different patterns. By only changing the pattern of the screen mask or the shape of the lens, the same male mold can be used for manufacturing different lens-implanted optical sheet. Therefore, the flexibility for the production of various optical sheets is greatly simplified and improved.

Although the present invention has been explained in relation to its preferred embodiment, it is to be understood that many other possible modifications and variations can be made without departing from the spirit and scope of the invention as hereinafter claimed.

What is claimed is:

1. A method for manufacturing a lens-implanted optical sheet comprising following steps:
    (A) laying a patterned screen mask having a plurality of holes or grooves on an inner surface of a mold;
    (B) coating or transferring-printing a layer of an adhesive or a binder on part of said inner surface through said grooves or said holes of said patterned screen mask;
    (C) removing said patterned mask from said inner surface of said mold;
    (D) spraying or distributing a plurality of lens or prisms and locating said lens or said prisms on said adhesive or said binder on said inner surface of said mold;
    (E) closing said mold and injecting a polymer into said mold to form a molded optical sheet; and
    (F) opening said mold and taking out said molded optical sheet.

2. A method for manufacturing a lens-implanted optical sheet comprising following steps:
    (A) coating or transferring-printing a layer of an adhesive or a binder on part of an inner surface of a mold;
    (B) laying a plurality of lens or prisms on said inner surface of said mold through the binding of said adhesive or said binder;
    (C) closing said mold and injecting a polymer into said mold to form a molded optical sheet; and
    (D) opening said mold and taking out said molded optical sheet.

3. The method as claimed in claim 1 or 2, further comprising coating a release agent on said inner surface before coating or transferring-printing a layer of an adhesive or a binder on part of an inner surface of a mold.

4. The method as claimed in claim 1 or 2, wherein said lens or prisms are in a shape of a stripe or a bar.

5. The method as claimed in claim 1 or 2, wherein said lens or prisms are in a tetrahedron, pyramids, cones, egg, half-balls or balls.

6. The method as claimed in claim 1 or 2, wherein said polymer is polymethyl methacrylate (PMMA).

* * * * *